US008150575B2

(12) United States Patent
Ewerhart et al.

(10) Patent No.: US 8,150,575 B2
(45) Date of Patent: Apr. 3, 2012

(54) PLAUSIBILIZATION OF SENSOR SIGNALS IN THE EVENT OF A COLLISION

(75) Inventors: Frank Ewerhart, Weinsberg (DE);
Reiner Marchthaler, Gingen (DE);
Thomas Lich, Schwaikheim (DE);
Mario Kroeninger, Buehl (DE);
Stephan Stabrey, Stuttgart (DE)

(73) Assignee: Robert Bosch GmbH, Stuttgart (DE)

( * ) Notice: Subject to any disclaimer, the term of this patent is extended or adjusted under 35 U.S.C. 154(b) by 545 days.

(21) Appl. No.: 11/887,531

(22) PCT Filed: Mar. 13, 2006

(86) PCT No.: PCT/EP2006/060646
§ 371 (c)(1),
(2), (4) Date: Dec. 17, 2008

(87) PCT Pub. No.: WO2006/106025
PCT Pub. Date: Oct. 12, 2006

(65) Prior Publication Data
US 2009/0132112 A1 May 21, 2009

(30) Foreign Application Priority Data
Apr. 7, 2005 (DE) .......... 10 2005 016 009

(51) Int. Cl.
*B60R 21/00* (2006.01)
(52) U.S. Cl. ............ 701/30.3; 701/29.7; 701/30.9
(58) Field of Classification Search .......... 701/35, 701/301, 29, 45–47, 29.7–29.9, 30.1–30.3, 701/30.5–30.9, 31.1; 342/357.09
See application file for complete search history.

(56) References Cited

U.S. PATENT DOCUMENTS

| 6,295,495 | B1 | 9/2001 | Morman et al. | |
| 6,636,794 | B2 | 10/2003 | Yamashita | |
| 7,512,516 | B1* | 3/2009 | Widmann | 702/151 |
| 7,590,481 | B2* | 9/2009 | Lu et al. | 701/70 |
| 7,831,357 | B2* | 11/2010 | Loeckle et al. | 701/45 |
| 2002/0075139 | A1 | 6/2002 | Yamamoto et al. | |
| 2003/0154009 | A1* | 8/2003 | Basir et al. | 701/35 |
| 2004/0030499 | A1* | 2/2004 | Knoop et al. | 701/301 |
| 2004/0032322 | A1* | 2/2004 | Kocher et al. | 340/436 |
| 2004/0088094 | A1* | 5/2004 | Kleinschmidt et al. | 701/45 |
| 2004/0158376 | A1* | 8/2004 | Knueppel et al. | 701/45 |
| 2004/0254729 | A1* | 12/2004 | Browne et al. | 701/301 |
| 2006/0106538 | A1* | 5/2006 | Browne et al. | 701/301 |

FOREIGN PATENT DOCUMENTS

| CN | 1358645 | 7/2002 |
| JP | 11-180294 | 7/1999 |
| JP | 2000-272467 | 10/2000 |
| JP | 2002-53024 | 2/2002 |
| WO | WO 98/10297 | 3/1998 |
| WO | WO 02/053419 | 7/2002 |

* cited by examiner

*Primary Examiner* — Thomas G. Black
*Assistant Examiner* — Marthe Marc-Coleman
(74) *Attorney, Agent, or Firm* — Kenyon & Kenyon LLP

(57) ABSTRACT

A method for plausibilizing sensor signals of a vehicle system, the sensor signals being monitored with regard to compliance with one plausibility criterion or a plurality of plausibility criteria with the aid of a plausibilization algorithm. The function of the vehicle system is able to be maintained even in critical driving situations, in particular following a collision, if the driving status of the vehicle is monitored with regard to a collision and the plausibilization algorithm is modified if a collision was detected.

19 Claims, 1 Drawing Sheet

PLAUSIBILIZATION OF SENSOR SIGNALS IN THE EVENT OF A COLLISION

FIELD OF THE INVENTION

The present invention relates to a method for plausibilizing sensor signals of a vehicle system, and to a corresponding device.

BACKGROUND INFORMATION

Modern vehicles may be equipped with a multitude of devices that intervene in the vehicle operation in a regulating or controlling manner. Among these are, in particular, electronic stability systems (such as ESP), automatic braking systems (such as ABS), driver assistance systems (such as ACC), restraining systems (such as airbag systems), as well as a variety of value-added functions, for instance an automatic cornering light or starting-traction control (such as HHC).

Each system utilizes sensors whose signals are read and processed and on whose basis a control or regulation operation is implemented. In order to avoid false triggering of the systems, the sensor signals are usually filtered and subjected to a plausibility check. This ensures that the system takes only plausible signals into account. If implausible signal values occur, the known systems usually respond by restricting functions (default level) or, in the extreme case, by complete deactivation of the system. The signal monitoring normally takes place in the control device of the particular vehicle system.

In general, at least single-signal monitoring, during which the value range and/or the gradient of the signals is checked and possibly occurring sensor reports are analyzed, is implemented within the framework of plausibilization. It is also known to compare the sensor signals to estimated values that were calculated from various other sensor signals (so-called model-based plausibilization).

The known plausibilization methods may function sufficiently well during normal vehicle operation. However, in extreme driving situations, such as after a collision, signal values or signal changes may occur that far exceed the plausible range. The sensor signals in question are then considered implausible or they are falsified by excessive filtering. This may lead to the particular system switching into a default mode with reduced functional scope or to the system automatically deactivating itself. If safety-relevant systems such as an electronic stability program are involved, the driving safety may be reduced as a result. This is especially critical in offset rear collisions or offset side collisions during which a high yaw moment is acting on the vehicle, which induces rapid rotation of the vehicle. Without additional assistance devices, the vehicle may possibly get out of control completely and cause secondary accidents that may have serious results if high speeds are involved.

SUMMARY OF THE INVENTION

Therefore, it is an object of the exemplary embodiments and/or exemplary methods of the present invention to ensure the functioning of vehicle systems, in particular safety-relevant systems, even under extreme driving situations such as following a collision and, at the same time, not to reduce the robustness of such devices with respect to signal interferences during normal operation.

In accordance with the exemplary embodiments and/or exemplary methods of the present invention, this objective may be achieved by the features described herein. Further embodiments of the present invention are also described herein.

An idea of the exemplary embodiments and/or exemplary methods of the present invention is to enlarge the signal plausibility range in the event of a collision in order to maintain full functionality of the particular vehicle system in such a case. According to the exemplary embodiments and/or exemplary methods of the present invention, the driving status of the vehicle is monitored with regard to a collision and at least one plausibility criterion, for instance a specified limit value for the absolute value or the permissible signal change, is modified if a collision is detected. This has the considerable advantage that the function of the higher-order system is retained even in limit situations, and that the functioning of these systems during normal operation of the vehicle is not adversely affected at the same time.

Typical sensors of vehicle systems whose signals are subjected to a plausibility check are, for example, yaw rate, acceleration, wheel-speed and angle sensors or other types of sensors as well.

If the monitored sensor signal is filtered prior to the plausibility check, at least one filter parameter may be modified if a collision was detected. The particular sensor signal is thereby filtered to a lesser degree in the event of a collision and thus falsified to a lesser degree.

According to one specific embodiment of the present invention, the driving status of the vehicle is monitored with regard to a collision with the aid of acceleration and/or pressure sensors. Vehicles that have an airbag system installed may utilize the sensors of this system as well.

A device for plausibilization of sensor signals according to the present invention may include an electronic device such as a control device having a plausibilization algorithm, which monitors at least one sensor signal, as well as a sensor system for collision detection whose signal is transmitted to the electronic device. In the event of a collision the plausibility range will be broadened, as described earlier, so that higher signal values or more significant signal changes may be classified as plausible as well.

The algorithm for collision detection may be integrated in the airbag control device and transmits a corresponding collision signal to the control device of the vehicle system in the event of a collision. The plausibilization algorithm may be integrated in the control device of the vehicle system. Of course, the algorithm for collision detection could also be integrated in a control device other than the airbag control device, for instance in the control device of the vehicle system.

According to a first specific embodiment, the plausibility criteria or filter parameters are modified by fixed, specified values.

However, the adaptation of the plausibility criteria or filter parameters may optionally also be implemented as a function of the force and/or the location of the collision. In the latter case, the device according to the present invention includes a corresponding sensor system by which the force and/or the location of the collision are/is able to be determined. In a vehicle having an installed restraining system, the sensors of the restraining system already provided may be used for this purpose as well.

Instead of the pressure or acceleration sensors, a video-based system (such as a driving-lane detection system), a radar system or some other environment sensor system may be used for collision detection as well, either as an alternative or in addition.

In the following text, the exemplary embodiments and/or exemplary methods of the present invention is explained in greater detail by way of example with reference to the attached drawings and the following description.

DETAILED DESCRIPTION

Figure 1:
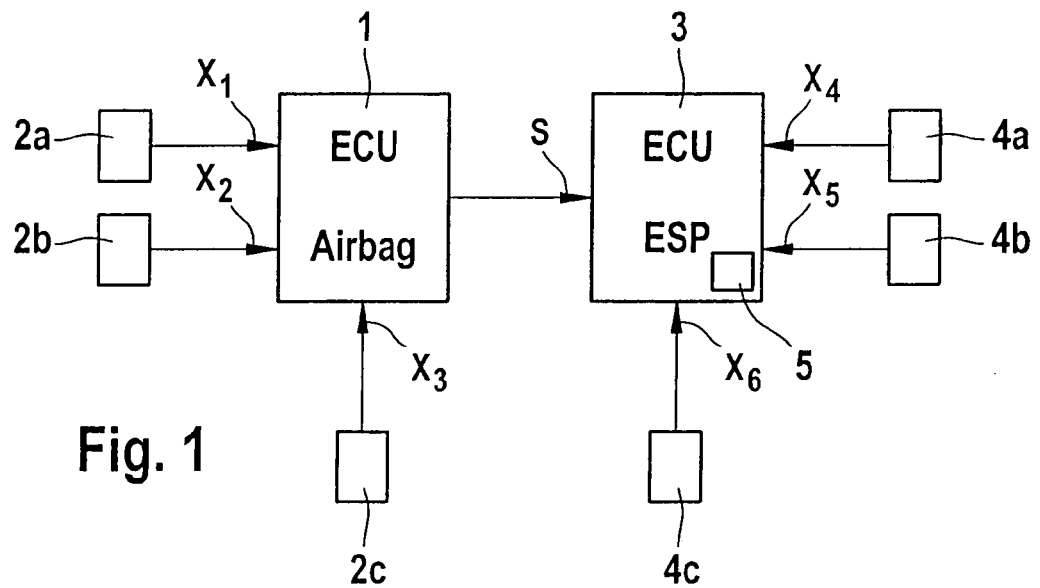
FIG. 1 shows a schematic block diagram of a driver-assistance system with requisite sensor system and a device for plausibilizing the sensor signals.

FIG. 1 shows a schematic, greatly simplified representation of a restraining system (airbag system) 1, 2a-2c, and an electronic stability control system (ESP) 3, 4a-4c including corresponding sensors 2a-2c and 4a-4c, respectively.

The electronic stability control system (ESP) includes a control device 3 having a control algorithm, which intervenes in the vehicle operation in critical driving situations via corresponding actuators (not shown). The stabilizing intervention is normally carried out with the aid of the brake system and/or the steering system of the vehicle. Sensors 4a-4c may be, for instance, yaw rate, acceleration, wheel-speed, and/or steering angle sensors. The sensor signals are denoted by $x_4$-$x_6$.

Airbag system 1, 2a-2c also includes a control device 1 with corresponding sensors 2a-2c. Sensors 2a-2c may be acceleration and/or pressure sensors, for instance. The sensor signals are denoted by $x_1$-$x_3$.

In order to be able to respond to signal interferences of sensor signals $x_4$-$x_6$, the electronic stability control system monitors sensor signals $x_4$-$x_6$ with the aid of a plausibilization algorithm 5. Within the scope of the plausibilization, monitoring of individual signals is implemented during which, in particular, the value range and the gradient of signals $x_4$-$x_6$ are analyzed, and possibly occurring sensor reports are evaluated. In the process, signals $x_4$-$x_6$ or the signal changes are compared to corresponding limit values and, depending on the result, the signal in question is categorized as plausible or implausible. In the case of implausible signals, stabilization system 3,4 is switched into a default mode having reduced functional scope, or it may possibly also be deactivated completely. Sensor signals $x_4$-$x_6$ are filtered in addition in order to make the system more rugged with regard to interference.

Plausibilization algorithm 5 operates in a first plausibilization mode during normal vehicle operation, and in a second mode having different plausibilization criteria in the event of a collision. This fully maintains the functionality of the driving dynamics stabilization system even after a collision has occurred, and the vehicle continues to be able to be stabilized automatically.

The two control devices 1,3 are interconnected with the aid of a data connection via which ESP control device 3 receives an information item S about a possible collision from airbag control device 1. In the simplest case, signal S may be a collision flag, for example, but it could also be a more complex signal, which may possibly include information about the force and/or location of the collision as well.

As soon as a collision was detected, control device 1 transmits a corresponding signal S to control device 3 of the electronic stability control system. After receipt of the signal, at least one plausibilization criterion is modified, so that the plausible range is broadened. As an alternative or in addition, a filter parameter, for instance, may be modified also. If collision signal S includes an information item about the force and/or the location of the collision, then the criteria or parameters may be modified as a function of this information as well.

Figure 2:
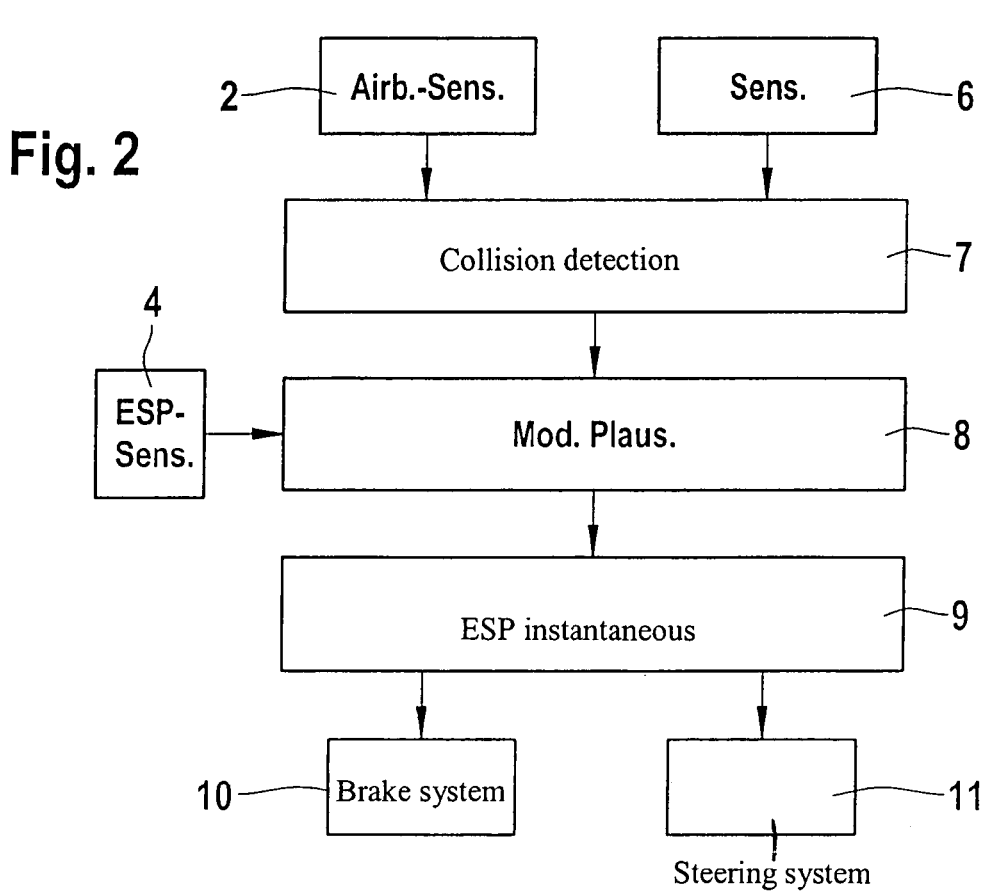
FIG. 2 shows the essential method steps of a method for adapting the plausibilization and filtering in the event of a collision.

FIG. 2 shows the essential method states in an adaptation of plausibilization algorithm 5 following a collision. Blocks 2 and 6 represent airbag sensors 2 and other environment sensors 6, such as a video system, for instance, by which the driving status is monitored with regard to a collision. If a collision has occurred, this is detected by airbag control device 1, and the collision is classified according to the force and/or the impact location, if appropriate (block 7). The aforementioned adaptation of the plausibilization and/or filtering takes place in block 8. The ESP sensors are combined in one block 4 in this case.

In block 9, an ESP stabilization intervention by which the vehicle is to be stabilized is triggered after a collision as well. In this case the stabilization intervention may optionally be implemented with the aid of wheel brakes 10 and/or steering system 11. Driving dynamics control system 3, 4 thus remains fully operable even in the event of a collision.

What is claimed is:

1. A method for plausibilizing sensor signals of a vehicle system of a vehicle, the method comprising:
   checking the sensor signals with regard to compliance with at least one plausibility criteria with the aid of a corresponding algorithm, wherein a driving status of the vehicle is monitored with regard to a collision, and the checking includes determining whether a value of the sensor signals exceeds a plausible range; and
   modifying the at least one plausibility criterion if a collision is detected,
   wherein the modifying includes broadening the plausible range for the detected collision.

2. The method of claim 1, wherein the sensor signals are filtered prior to the plausibilization, and at least one filter parameter is modified if a collision is detected.

3. The method of claim 1, wherein a value range or a gradient of the sensor signals is monitored within a framework of the plausibilization.

4. The method of claim 1, wherein a monitored sensor signal is a signal from at least one of a yaw rate, an acceleration rate, a wheel speed, and an angle sensor.

5. The method of claim 1, wherein the plausibility criterion is modified as a function of at least one of the force and a location of the collision.

6. The method of claim 1, wherein the sensor signals are filtered prior to the plausibilization, and at least one filter parameter is modified if a collision is detected, and wherein a value range or a gradient of the sensor signals is monitored within a framework of the plausibilization.

7. The method of claim 6, wherein a monitored sensor signal is a signal from at least one of a yaw rate, an acceleration rate, a wheel speed, and an angle sensor.

8. The method of claim 7, wherein the plausibility criterion is modified as a function of at least one of the force and a location of the collision.

9. The method of claim 6, wherein the plausibility criterion is modified as a function of at least one of the force and a location of the collision.

10. A device for plausibilizing sensor signals of a vehicle system of a vehicle, comprising:
    an electronic device having a plausibilization algorithm, which checks at least one sensor signal for compliance with a specified plausibility criterion to determine whether a value of the sensor signals exceeds a plausible range; and a sensor system for collision monitoring, and whose output signals are processed by the electronic device or by another electronic device, wherein at least one plausibility criterion is modified if a collision is detected;

wherein the modifying includes broadening the plausible range for the detected collision.

11. The device of claim 10, wherein the sensor system for collision monitoring includes at least one of an acceleration sensor and a pressure sensor.

12. The device of claim 10, wherein the sensor system for collision monitoring is able to detect at least one of a force and a location of the collision.

13. The device of claim 10, wherein sensors of an airbag system are used as the sensors for the monitoring of the collision.

14. The device of claim 10, wherein at least one environment sensor is used for the monitoring of the collision.

15. The device of claim 10, wherein at least one of a video sensor, a radar sensor, a lidar sensor, and an ultrasonic sensor is used for a monitoring of a collision.

16. The device of claim 10, wherein the sensor system for collision monitoring includes at least one of an acceleration sensor and a pressure sensor, and wherein the sensor system for collision monitoring is able to detect at least one of a force and a location of the collision.

17. The device of claim 16, wherein sensors of an airbag system are used as the sensors for the monitoring of the collision.

18. The device of claim 16, wherein at least one environment sensor is used for the monitoring of the collision.

19. The device of claim 16, wherein at least one of a video sensor, a radar sensor, a lidar sensor, and an ultrasonic sensor is used for a monitoring of a collision.

* * * * *